May 20, 1947.　　　J. J. BLACK　　　2,420,854
TIRE CARRIER
Filed Nov. 15, 1945

INVENTOR.
James J. Black
BY
Wood, Arey, Herron & Evans
ATTORNEYS

Patented May 20, 1947

2,420,854

UNITED STATES PATENT OFFICE 2,420,854

TIRE CARRIER

James J. Black, Cincinnati, Ohio, assignor to The Trailmobile Company, Cincinnati, Ohio, a corporation of Delaware Application November 15, 1945, Serial No. 628,700

5 Claims. (Cl. 224—29)

This invention relates to a tire carrier for supporting one or more spare tires on a highway vehicle, and is particularly directed to a carrier of the type which is adapted to be positioned on the under side of a vehicle of substantial size such as a trailer.

In tire carriers of the type to which the invention is particularly directed considerable difficulty has always been encountered in attempting to adjust the carrier to various sizes of tires, and in releasing and refastening the carrier, the latter difficulty being accentuated by the location of the carrier under the vehicle. There has been a substantial need for a carrier of simple construction which would be strong and sure in operation, easy to connect and disconnect, and readily adapted to support tires of various different sizes.

One of the objects of the present invention has been to provide a carrier which performs the necessary function with a minimum of working parts.

Another object has been to provide a carrier which can be secured or released with the least possible effort and inconvenience.

Another object has been to provide a carrier which is readily adjustable and equally effective in supporting tires of the various different standard sizes.

Other and further objects and advantages will be apparent from the further and more detailed description of the invention when considered in conjunction with the drawings in which.

Figures 1, 2:
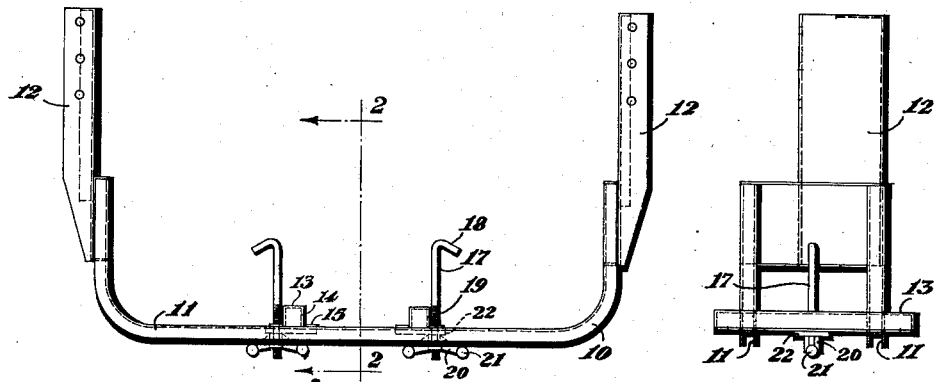
Figure 1 is a side elevation of a tire carrier adapted to be suspended beneath a highway vehicle and constituting a preferred embodiment of the invention.
Figure 2 is a sectional view along the line 2—2, Figure 1.

Referring again to the drawings for a further and more detailed description of the preferred embodiment of the invention therein disclosed, the carrier 10 is constituted by a pair of U-shaped channels 11 disposed in side-by-side relationship and spaced apart from one another. These channels constitute what may be termed a cradle for the reception of and support of the tires. The upwardly curved ends of the channels 11 may be secured as by welding to support posts 12 which in turn are secured to the body of the highway vehicle which is not shown in the drawings.

Figure 5:
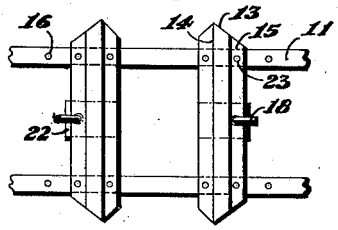
Figures 5, 6 and 7 are top plan views of the central portion of the carrier illustrating somewhat diagrammatically the positioning of the various elements in securing wheels having rims of three different diameters.
Figure 3:
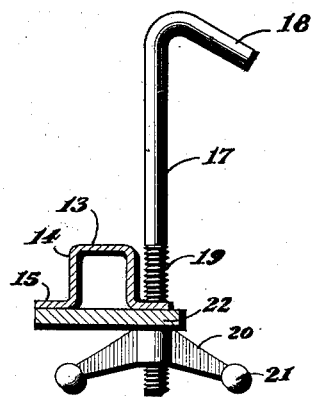
Figure 3 is a side elevation, greatly enlarged, of one of the clamp bolts adapted to hold the tires in position.
Figure 6:
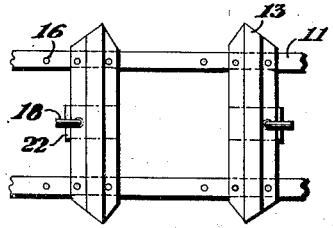
Figure 4:
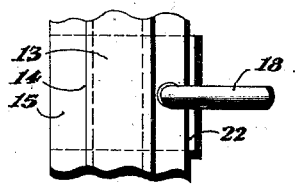
Figure 4 is a top plan view of a clamp bolt in position for use.
Figure 7:
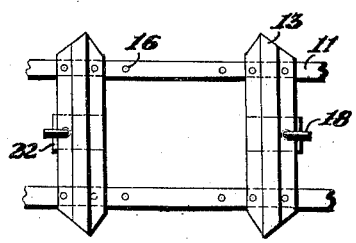

Positioned transversely of the cradle are a pair of locating bars 13—13, preferably of the somewhat irregular hexagonal configuration shown in Figures 5, 6 and 7. These bars may have channels 14 disposed centrally thereof and laterally extending side flanges 15. The locating bars are designed to be disposed centrally of the tire rim and the ends of the channels provide an interior support therefor. A series of apertures 16 are formed vertically in each of the U-shaped channel members in two sets of three each, the corresponding apertures in each set being substantially aligned. These apertures are designed for receiving bolts (not shown) for securing the locating bars to the U-shaped channels through corresponding apertures 23 in the locating bars. As illustrated in Figures 5, 6 and 7, by adjusting the locating bars in various positions and securing them to the U-shaped channels selectively through the apertures the distance between the locating bars may be spread or narrowed as desired to adjust them to the support of rims of various diameters ranging from twenty inches in the position shown in Figure 5 to twenty-two inches in the case of Figure 6 and to twenty-four inches in the case of Figure 7. Obviously, adjustments applicable to other sizes may be provided as desired.

For holding the tires firmly in position on the cradle a pair of J bolts 17 are provided, the heads of the bolts 18 being configurated to engage with the rims of the tire or tires. These bolts have their lower ends screw threaded as at 19 and wing nuts 20 may be secured to the lower end of the bolts for fastening them in position. These nuts preferably have knobs 21 formed on the extended wings for facilitating the tightening and loosening of the bolts. Plate members 22 are preferably secured to the under side of the locating bars as by welding to provide rigidity thereto and to facilitate the operation of the J bar.

In the general operation of the device the locating bars 13 are first adjusted to position for reception of the particular sized tire. The ends 18 of the J bolts are then turned inwardly to permit the placing of the tires in position. Thereafter the position of the ends of the J bolts is reversed and the wing nuts 20 are threaded upwardly to bring the J bolts down into clamping position on the tires.

One of the particular features of the invention is the ease with which the locating bars may be adjusted to accommodate various different sizes of the tires. Inasmuch as each locating bar and its corresponding J bolt is a substantially integral structure it is necessary only to change the position of one locating bar to adjust the carrier from a twenty to a twenty-two inch rim or from a twenty-two to a twenty-four inch rim. In making these adjustments the change of the positioning of only four bolts is required.

The device is of extreme simplicity in construction but is very strong and effective in operation. Since the operating parts have been kept at a minimum, repair and replacement problems have been completely avoided.

While the device as herein described and illustrated represents a preferred embodiment of the invention, it will be obvious that various changes and departures may be made from the exact form of the structure shown without departing from the principles of the invention as set out in the ensuing claims.

Having described my invention, I claim:

1. A tire carrier for a heavy duty highway vehicle comprising a tire supporting cradle adapted to be positioned beneath a vehicle and secured thereto, a pair of locating bars disposed transversely of the cradle, said locating bars being adjustable to various spaced apart positions, and a pair of J bars for holding the tire to the cradle, each of said J bars being carried by a locating bar and being adjustable therewith.

2. In a tire carrier for a highway vehicle, a pair of U-shaped rails suspended beneath the vehicle and spaced apart to form a cradle for supporting a tire, a pair of locating bars disposed transversely of the cradle and adapted to fit interiorly of the tire rim, said locating bars being adjustable on the U-shaped rails to various spaced apart positions, and clamping means for clamping the tire to the cradle, said clamping means being supported by a locating bar centrally of said bar and being adjustable therewith.

3. In a highway vehicle, a spare tire carrier adapted to be suspended beneath said vehicle comprising a pair of U-shaped rails secured to the vehicle adjacent its under side, said rails being spaced apart and disposed in substantial parallelism to form a cradle for the reception and support of a spare tire, said rails having a plurality of adjustment apertures vertically disposed therein, a pair of locating bars secured to the rails transversely thereof through the adjustment apertures in spaced apart relationship, said locating bars being adapted to fit interiorly of and selectively to support the rims of various sized tires, and a pair of J clamps for clamping the tire to the cradle, said J clamps being screw threaded vertically in the locating bars and being adjustable therewith to the various selected positions.

4. A tire carrier for a highway vehicle, comprising a tire supporting cradle constituted by a pair of U-shaped rails secured to the vehicle body and depending beneath said body in spaced apart relationship and means for clamping a spare tire to the upper surface of said cradle, said means including a pair of locating bars for supporting the interior of the rim of a tire positioned on the cradle, said bars being seated on the cradle in spaced apart relationship and transversely disposed thereto, said bars being adjustable lengthwise of the cradle to various spaced apart positions for accommodating tires of various different sizes and a pair of clamps for clamping the tires to the cradle, each of said clamps being carried by one of the locating bars.

5. A tire carrier for a highway vehicle comprising a tire supporting cradle adapted to be positioned beneath a vehicle and secured thereto, a pair of plate members positioned on said cradle transverse thereto in side by side relationship, said plate members being adjustable toward and away from each other and being adapted to fit on the interior of the rims of various sized tires positioned on the cradle and clamping means carried by the plate members and adjustable therewith for clamping the tire to the cradle.

JAMES J. BLACK.

REFERENCES CITED

The following references are of record in the file of this patent:

UNITED STATES PATENTS

| Number | Name | Date |
|---|---|---|
| 1,550,447 | Neely | Aug. 18, 1925 |
| 1,761,968 | Bock | June 3, 1930 |
| 1,947,820 | Alborn | Feb. 20, 1934 |
| 1,589,955 | Green | June 22, 1926 |
| 1,798,939 | Hebner | Mar. 31, 1931 |

FOREIGN PATENTS

| Number | Country | Date |
|---|---|---|
| 537,629 | Great Britain | June 30, 1941 |